Sept. 23, 1947.　　　　R. R. CURTIS　　　　2,427,716
PUMP SEAL
Filed Dec. 26, 1944
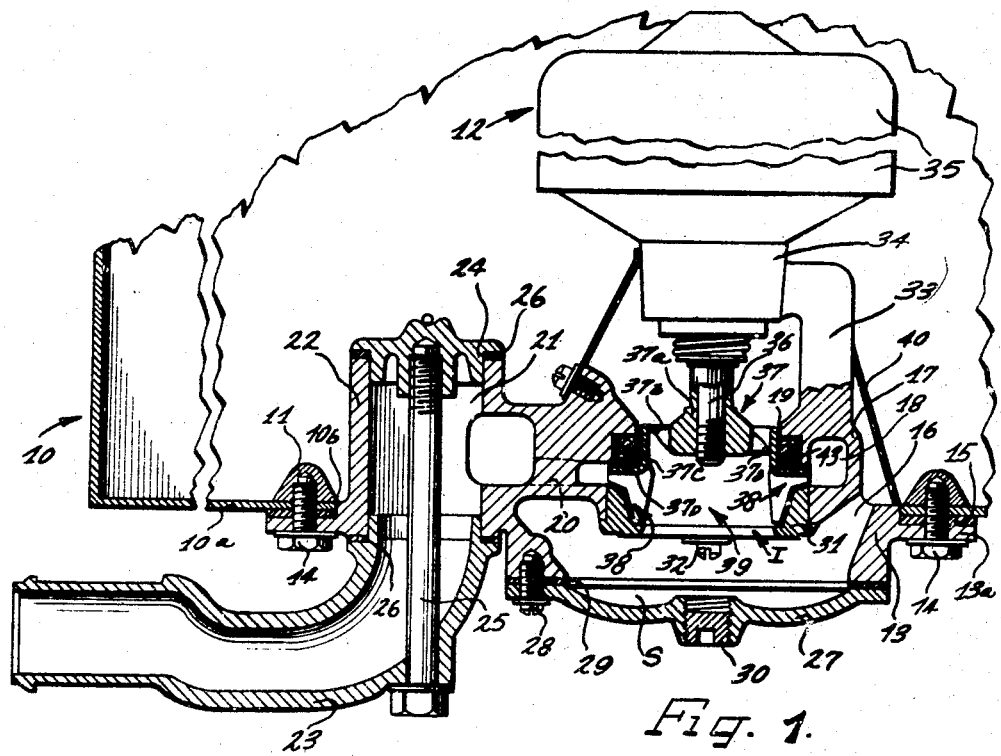
Fig. 1.
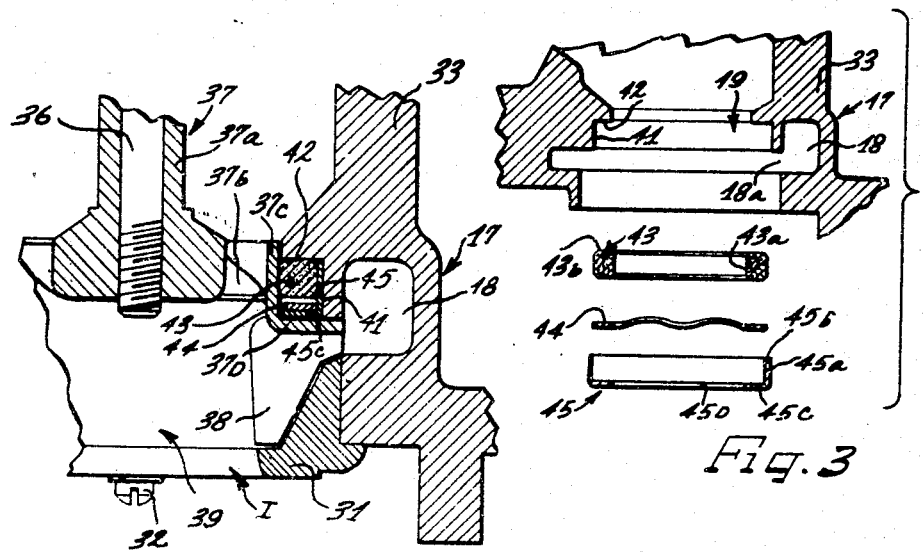
Fig. 2.
Fig. 3.
Inventor
Russell R. Curtis
by The Firm of Charles K. Ellery
Attys.

Patented Sept. 23, 1947

2,427,716

UNITED STATES PATENT OFFICE 2,427,716

PUMP SEAL

Russell R. Curtis, Dayton, Ohio, assignor to Curtis Pump Company, Dayton, Ohio, a corporation of Ohio Application December 26, 1944, Serial No. 569,737

6 Claims. (Cl. 103—103)

This invention relates to a seal construction for the impeller of a centrifugal type pump and specifically relates to a spring-pressed carbon ring type seal for the impeller of a submerged type booster pump.

The invention will hereinafter be specifically described as embodied in a submerged booster pump for an aircraft fuel system, but it should be understood that the seal of this invention is useful in many other embodiments and it is not intended that the scope of patent protection on the invention be limited entirely to a particular embodiment of the invention.

In accordance with this invention a carbon ring seal is spring pressed against a pump casing and is effective to isolate the high pressure volute chamber of the casing from the ambient pressure of liquid surrounding the casing when it is submerged in a tank. A carbon ring is used as the seal body. Heretofore, such carbon rings were shattered when subjected to excessive vibration which was sometimes encountered when the pump ran dry and the motor driving the pump speeded up.

This invention includes the provision of a spring-pressed semi-floating carbon ring. The spring holds the ring against the pump casing and eliminates breakage due to vibration.

Seals of this invention preferably include a retainer adapted to be pressed into fixed position in the casing. This retainer houses a spring washer and the carbon seal ring. The washer urges the seal ring into sealing engagement with the casing and eliminates excessive vibration of the seal ring.

It is, then, an object of this invention to provide a seal for pump impellers which will not break when subjected to excessive vibration.

Another object of the invention is to provide a pump seal including a resiliently mounted carbon ring capable of being rotated when engaged by a rotating part of a pump and yet being sufficiently retained by a stationary part of the pump to resist shattering even when the pump is subjected to excessive vibration.

A still further object of the invention is to provide a carbon seal for pumps wherein the carbon is resiliently held in a semi-floating condition.

A still further object of the invention is to provide an impeller seal for booster pumps which has a brittle seal part held in a semi-floating condition in the pump casing and adapted to be rotated when engaged by the pump impeller but normally being maintained in stationary relation relative to the casing.

A further object of the invention is to provide a seal assembly for the impeller of a submerged type centrifugal booster pump which is readily pressed into the pump casing and includes a spring-impelled carbon ring in close running relation with the pump impeller and in sealing engagement with the pump casing.

Other and further objects of the invention will be apparent to those skilled in the art from the following detailed description of the annexed sheet of drawings which, by way of a preferred example only, illustrates one embodiment of the invention.

On the drawings:

Figure 1 is a broken fragmentary vertical cross-sectional view, with parts in side elevation, of a submerged booster pump, equipped with an impeller seal according to this invention, and mounted in a tank.

Figure 2 is an enlarged fragmentary vertical cross-sectional view of a portion of the pump of Figure 1 better illustrating the cooperation between the seal of this invention and the impeller pump.

Figure 3 is an exploded fragmentary vertical cross-sectional view of a portion of the pump casing and the seal parts of this invention for fitting into the casing.

As shown on the drawings:

In Figure 1 the reference numeral 10 designates a tank such as the fuel tank of an airplane. The tank 10 has a bottom wall 10a with a large aperture 10b therein.

A pump mounting ring 11 is mounted on the bottom wall 10a of the tank and surrounds the aperture 10b.

A pump and electric motor unit 12 is submerged in the tank 10 and is mounted on the bottom wall 10a to close the aperture 10b thereof. This unit 12 has a mounting base 13 with a peripheral flange 13a therearound underlying the tank wall 10a. Cap screws 14 are passed through the flange 13a and tank wall 10a and are threaded into the mounting ring 11 to secure the mounting base 13 on the tank. A gasket 15 is interposed between the tank wall 10a and the flange 13a to seal the opening 10b.

The mounting base 13 is connected through ribs such as 16 with a pump casing 17 defining an annular volute or pumping chamber 18. The volute chamber 18 is formed around a central open ended passageway 19.

A passageway 20 connects the volute chamber 18 with a passageway 21 in an upstanding tubular boss member 22. This boss member 22 is integral with the base 13 and is spaced laterally from the pump casing 17. The tubular boss extends beyond the bottom of the base 13 and receives a conduit fitting 23 in the lower end thereof. A cap 24 closes the top end of the base and a single bolt 25 is passed through the fitting 23 and threaded into the cap 24 to clamp the fitting and cap on the opposite end of the boss. Gaskets 26 are interposed between the boss and the cap and conduit fitting.

Liquids from the volute chamber 18 are pumped through the passageway 20 into the passageway 21 and thence through the conduit fitting 23 to the fuel line of the airplane fuel system. This fuel line customarily supplies the engine-driven main fuel pump of the system (not shown).

The mounting base 13 has a separate closure plate 27 secured thereon by means of cap screws 28, and maintained in sealing relation therewith by a gasket 29. The closure plate 27 is beneath the bottom wall 10a of the tank and provides a sump S for the tank. This sump can be drained by removal of a plug 30 threaded into the plate 27.

A throat ring 31 is secured in the bottom of the pump casing 17 by means of cap screws 32 and defines an inlet I communicating freely with the sump S. This sump S communicates freely with the interior of the tank 10 and is in open communication with the tank between the ribs such as 16 and the portion defining the passageway 20.

The casing 17 has an upstanding leg 33 carrying a base 34 on which is mounted a motor casing 35. The motor in the casing 35 has a drive shaft 36 extending through the base 34 and carrying the pump impeller 37.

The pump impeller 37 has a hub 37a secured to the shaft and screw vanes or propeller blades 37b radiate from the hub 37a. These blades 37b are surrounded by a skirt or collar 37c with an outturned flange 37d on the lower end thereof.

Impeller blades 38 depend from the flange 37d in spaced relation around the flange. These blades 38 have elongated inner edges extending from the inlet I to the collar 37c. The vanes 38 and collar 37c operate in the open-ended passageway of the pump and the inner edges of the vanes surround a central chamber 39 communicating freely at its lower end with the inlet I and communicating at its upper end with the propellers 37b. The vanes 38 project radially under the flange 37d into the volute chamber 18.

Liquid fuel from the tank 10 fills the sump S and flows through the inlet I into the passageway 39 where it is acted upon by the vanes 38. The inner edges of these vanes are effective to liberate bubbles of gas and vapor from the fuel. The fully liquid fuel is thrown by centrifugal force into the volute chamber 18 and through the passageway 20 into the passageway 21 and conduit fitting 23. The bubbles are ejected back into the tank by the propeller blades 37b.

A screen 40 surrounds the inlet to the sump and the outlet from the blades 37b so that all of the fuel acted on by the pump is filtered.

In accordance with this invention the volute chamber 18 is sealed from the ambient liquid pressure above the propeller portions 37b of the impeller 37 by means of a carbon sealing ring which is spring-pressed into sealing engagement with the pump casing and has close-running clearance relation with the skirt 37c of the impeller. The casing 17, as best shown in Figure 3, has a stepped bore providing the passageway 19 therethrough and this bore has a cylindrical wall portion 41 with a flat shoulder or end wall portion 42. The wall 41 is provided immediately adjacent the annular opening 18a connecting the passageway 19 with the volute chamber 18.

The seal assembly of this invention includes a ring 43 composed of hard and brittle compressed graphitic carbon or similar sealing material, a corrugated spring washer 44, and a retainer cup 45. The retainer cup 45 has a cylindrical side wall 45a sized for press-fit relation with the cylindrical wall 41 of the casing 17 together with an annular top rim 45b for bottoming on the shoulder 42 of the casing. The cup has a flat bottom wall 45c and a central aperture 45d through this bottom wall. The side wall 45a is of such a length so that when the rim 45b is bottomed on the shoulder 42 the bottom wall 45c will have close-running clearance relation with the flange 37d of the impeller skirt.

The corrugated washer 44 is bottomed on the flat wall 45c of the retainer cup 45 and has an inside diameter about the same as the diameter of the aperture 45d. The carbon ring 43 is bottomed on the corrugated washer 44, and the outside diameter of the carbon ring is slightly smaller than the inside diameter of the cylindrical wall 45b of the retainer cup so that the washer can have free sliding movement in the cup. The ring 43 has a cylindrical wall 43a defining an aperture which freely receives the skirt 37c of the impeller so that this impeller skirt has close-running clearance relation with the carbon washer when the assembly is pressed into the casing 17 as described above.

The washer 44 urges the slidably mounted carbon ring 43 against the shoulder 42 so that the end face 43b of the ring is maintained in sealing engagement with the casing.

Since the ring 43 is loosely held in the cup 45 but is spring-pressed into sealing engagement with the casing, leakage from the volute chamber 18 out of the casing through the passageway 19 is prevented, but the carbon ring can rotate in the event it is contacted by the skirt 37d of the impeller. As a result of this arrangement, the carbon ring will not break when sidewise movement of the impeller causes the impeller to touch the ring while at the same time excessive vibration of the assembly will not shatter the ring because it is spring-pressed against the casing shoulder.

The close-running clearance relationship between the wall 45c of the retainer and the skirt flange 37d of the impeller, together with the close-running clearance relationship between the carbon ring 43 and the skirt 37c of the impeller maintain an effective seal along this L-shaped path from the volute chamber 18 through the top of the passageway 19. Leakage along any other path except the L-shaped path between the seal assembly and the flange skirt of the impeller is prevented by the sealing engagement between the carbon ring and the pump casing.

From the above descriptions it should be understood that the invention provides a simple, inexpensive seal assembly for centrifugal type pumps and the like, which assembly can be easily pressed into a pump casing for effectively sealing the volute chamber or pumping chamber of the casing against leakage.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A pump construction comprising a pump casing defining a central passageway and an annular volute chamber surrounding said passageway in communication therewith, said casing having a cylindrical bore with a flat end shoulder defining a part of said passageway and located adjacent one end of the passageway, an impeller rotatably mounted in said passageway having a skirt portion spaced inwardly from the wall defining said bore and a flange on said skirt portion underlying said flat end portion in spaced relation therefrom and projecting radially toward said pumping chamber, said impeller having pumping vanes depending from said flange portion of the skirt and arranged for pressuring fluids in the passageway into said pumping chamber, a retainer cup having a cylindrical side wall pressed into said bore and an apertured end wall in close-running clearance relationship with said flange of the impeller, a sealing ring in said cup having an inner face in close-running clearance relationship with the skirt of said impeller and an end sealing face adjacent said end wall of the bore, and a spring washer interposed between said end wall of the retainer cup and said sealing ring urging the sealing face of said sealing ring into sealing engagement with said end wall of the casing.

2. A pump assembly comprising a pump casing defining a central open-ended passageway and an annular pumping chamber surrounding said passageway in communication therewith, an impeller rotatable in said passageway having a cylindrical collar portion adjacent the wall defining the passageway and an outturned flange extending radially into said pumping chamber together with pumping vanes depending from said flange arranged for pressuring liquid from the passageway into the pumping chamber, a sealing ring surrounding said cylindrical skirt of said impeller in close-running clearance relationship therewith, a retainer pressed into said casing slidably mounting said sealing ring in the casing, and spring means in said retainer acting on said sealing ring for urging the seal ring into engagement with said casing.

3. In a pump including a casing having an open-ended passageway and an annular pumping chamber around said passageway in communication therewith together with an impeller mounted for rotation in said passageway having a cylindrical collar portion, an outturned flange on said collar portion projecting into said pumping chamber and depending pumping vanes on said flange portion, the improvement of a seal assembly for sealing said pumping chamber against leakage through said passageway which comprises a retainer cup secured in said casing having an apertured wall surrounding said collar portion of the impeller and overlying said flange portion of the impeller in close-running clearance relationship therewith, a spring washer bottomed on said retainer wall, and a sealing ring in said cup having an inner face in close-running clearance relation with the collar portion of said impeller and a sealing face in sealing engagement with said casing, said spring washer acting on said sealing ring to maintain the sealing face of the ring in engagement with the casing.

4. In a pump casing defining an open-ended passageway and an annular pumping chamber surrounding said passageway in communication therewith, and an impeller rotatable in said passageway having vanes for pumping fluids into said chamber, the improvement of a seal assembly for said pumping chamber which comprises a retainer pressed into said passageway, a carbon seal ring slidably mounted in said retainer around said impeller in close running clearance relation to effect a seal, and a spring washer in said retainer acting on said carbon sealing ring to urge an end face of the ring into sealing engagement with the casing.

5. In a submerged booster pump assembly having a pump casing with an open-ended passageway and an impeller rotatably mounted in said passageway, the improvement of a seal for said passageway comprising a retainer cup secured in the casing, a carbon sealing ring surrounding the impeller in close-running clearance relation therewith to effect a seal between the impeller and ring, and a spring in said cup acting on said sealing ring holding the sealing ring in sealing engagement with the casing.

6. A booster pump assembly which comprises a pump casing defining an open-ended vertical passageway with an apertured end wall adjacent the top end of the passageway, and an annular pumping chamber surrounding the passageway in communication therewith, a pump impeller having an upstanding collar portion in said passageway with an outturned flange extending into said pumping chamber and carrying depending pumping vanes in said passageway, a retainer secured in said passageway around said collar in close-running clearance relation with said flange, a seal ring in said retainer surrounding said collar in close-running clearance relation, and a spring in said retainer acting on said seal ring to urge an end face of the seal ring into sealing engagement with said end wall of the passageway.

RUSSELL R. CURTIS.

REFERENCES CITED

The following references are of record in the file of this patent:

UNITED STATES PATENTS

| Number | Name | Date |
|---|---|---|
| 872,366 | Ver Planck | Dec. 3, 1907 |
| 969,517 | Boyd | Sept. 6, 1910 |
| 1,722,478 | Nelson | July 30, 1929 |
| 2,005,193 | Mayo | June 18, 1935 |
| 1,369,380 | Bogdanoff | Feb. 22, 1921 |